United States Patent [19]

Arima et al.

[11] Patent Number: 5,496,390

[45] Date of Patent: Mar. 5, 1996

[54] METHOD OF MANUFACTURING AN OPTICAL MODULE FOR WAVELENGTH DIVISION MULTIPLEX OPTICAL TRANSMISSION WITH REGULATION OF THE COUPLING RATIO AND COUPLING LENGTH

[75] Inventors: Tadao Arima; Koji Okamura, both of Kawasaki, Japan

[73] Assignee: Fujitsu Limited, Kawasaki, Japan

[21] Appl. No.: 235,251

[22] Filed: Apr. 29, 1994

Related U.S. Application Data

[63] Continuation of Ser. No. 892,748, Jun. 3, 1992, abandoned.

[30] Foreign Application Priority Data

Jun. 6, 1991 [JP] Japan .................................. 3-134872

[51] Int. Cl.$^6$ ............................. G02B 6/255; C03B 37/07
[52] U.S. Cl. ................................ 65/378; 65/411; 65/381; 385/42; 385/43
[58] Field of Search ........................... 65/378, 408, 411, 65/409, 381, 435, 485; 385/42, 43

[56] References Cited

U.S. PATENT DOCUMENTS

| 4,439,221 | 3/1989 | Smyth | 65/378 |
|---|---|---|---|
| 4,763,272 | 8/1988 | McLandrich | 65/378 |
| 4,765,816 | 8/1988 | Bjornlie | 65/4.2 |
| 4,790,614 | 12/1988 | Imoto et al. | 350/96.12 |
| 5,009,692 | 4/1991 | Miller | 65/4.21 |
| 5,015,058 | 5/1991 | Thorncraft | 65/409 |
| 5,017,206 | 5/1991 | Miller | 65/4.21 |
| 5,030,265 | 7/1991 | Suzuki | 65/485 |
| 5,119,453 | 6/1992 | Gonthier | 65/408 |
| 5,170,451 | 12/1992 | Ohshima | 385/42 |
| 5,171,345 | 12/1992 | Takemura | 65/4.3 |
| 5,176,730 | 1/1993 | Saganuma | 65/4.2 |
| 5,355,426 | 10/1994 | Daniel | 65/411 |
| 5,420,949 | 5/1995 | Arima | 65/411 |

FOREIGN PATENT DOCUMENTS

| 0256388 | 2/1988 | European Pat. Off. . | |
|---|---|---|---|
| 2937580A1 | 4/1981 | Germany . | |
| 2937580 | 4/1981 | Germany | 385/42 |
| 0127750 | 11/1978 | Japan | 65/4.3 |
| 0046208 | 3/1982 | Japan | 65/4.3 |
| 33421 | 2/1984 | Japan | 385/42 |
| 2-242205 | 9/1990 | Japan . | |

OTHER PUBLICATIONS

Patent Abstracts of Japan, vol. 14, No. 565 (P–1143) Dec. 17, 1990 & JP–A–22 42 205.
Patent Abstracts of Japan, vol. 15, No. 301 (P–1233) Jul. 12, 1991 & JP–A–31 07 110.
Database WPIL, Sect. Ch, Week 9041, Derwent Pub. Ltd., Class L03, AN 90–309630 & JP–A–2 220 008.
European Search Report dated Mar. 10, 1993.

Primary Examiner—David A. Simmons
Assistant Examiner—John Hoffmann
Attorney, Agent, or Firm—Armstrong, Westerman, Hattori, McLeland & Naughton

[57] ABSTRACT

A method of manufacturing an optical module for wavelength-division multiplex optical transmission, which module comprises a first optical fiber having a first port at its one end and a second and a third optical fiber fused to the first optical fiber at its side face such that the first optical fiber is positioned in the center between the second and third optical fibers. The manufacturing method comprises a first step of regulating the aspect ratio at the fused portion while heating the fused portion and elongating the fused portion at zero speed or a very low speed and a second step of regulating the coupling length of the fused portion while elongating the fused portion at a higher speed than in the aspect ratio regulating step under the conditions of the heating temperature of the fused portion lowered and the aspect ratio kept unchanged.

1 Claim, 3 Drawing Sheets

METHOD OF MANUFACTURING AN OPTICAL MODULE FOR WAVELENGTH DIVISION MULTIPLEX OPTICAL TRANSMISSION WITH REGULATION OF THE COUPLING RATIO AND COUPLING LENGTH

This application is a continuation of application Ser. No. 07/892,748 filed Jun. 3, 1992, now abandoned.

BACKGROUND OF THE INVENTION

1. Field of the Invention

The present invention relates to an optical module for wavelength-division multiplex optical transmission and a method for manufacturing the same.

2. Description of the Related Art

In recent years, there have been made research and development of application of optical transmission systems to subscribers systems in its enforcement stage. What is indispensable in enforcement of bidirectional optical transmission for subscribers systems using wavelength-division multiplex is an optical module having functions of multiplexer/demultiplexer for combining optical signals of different wavelengths (multiplexing) and separating signals combined by multiplex (demultiplexing). Establishment of a mass producing technology of such optical modules is the attainment of one of the key technologies for enforcement of the optical transmission system for subscribers systems.

With reference to FIG. 1, structure of a prior art optical module for wavelength-division multiplex optical transmission will be described below. On a substrate 2 for common use for electronic circuits and optical circuits, there is provided an optical waveguide substrate 4. On the optical waveguide substrate 4, there are formed a plurality of optical waveguides 5, 5a, 5b, and 7. The optical waveguide 5 is divided into the optical waveguides 5a and 5b at a Y-branch portion 8. The optical waveguide 5 and optical waveguide 7 are disposed contiguously to each other at a directional optical coupler portion 6 having a demultiplexing function. The optical waveguide 5 has an input port 10 at its left end, while the optical waveguides 7, 5a, and 5b have a first, a second, and a third port 12, 14, and 16 at their right ends, respectively.

An optical signal, which is a wavelength-division multiplexed signal of an optical signal with a wavelength of 1.3 µm and an optical signal with a wavelength of 1.55 µm, is transmitted over an optical fiber 18. When the multiplexed optical signal is input to the input port 10, it is divided at the directional coupler portion 6 into an optical signal with the wavelength of 1.55 µm and an optical signal with the wavelength of 1.3 µm, of which the optical signal with the wavelength 1.55 µm is propagated through the optical waveguide 7 and output from the first port 12. The optical signal with the wavelength 1.3 µm is divided into two equal divisions at the Y-branch portion 8, which are propagated through the optical waveguides 5a and 5b and output from the second and third ports 14 and 16, respectively. Therefore, by disposing photodetectors opposite to the ports 12, 14, and 16, the wavelength-division multiplexed optical signal can be received.

In this prior art example, to make bidirectional optical transmission possible, the first port 12 is connected to a photodetector 20 capable of receiving the optical signal with the wavelength 1.55 µm, the second port 14 is connected to a laser diode 24 outputting an optical signal with the wavelength 1.3 µm, and the third port 16 is connected to a photodetector 22 capable of receiving the optical signal with the wavelength 1.3 µm. Reference numeral 26 is an electronic circuit unit including a driver circuit of the laser diode, amplifiers for the photodetectors, etc.

In the conventional optical waveguide type optical module for wavelength-division multiplex optical transmission shown in FIG. 1, there is a demerit that it is difficult to obtain desired demultiplexing characteristics (wavelength dependence of the branching ratio) in a stabilized manner. Further, since it takes a long time in connecting an optical waveguide with an optical fiber, the module is not suited to mass production. Besides, there is such a demerit that the connection loss between the optical waveguide and optical fiber is great.

SUMMARY OF THE INVENTION

Accordingly, an object of the present invention is to provide a method of manufacturing an optical module for wavelength-division multiplex optical transmission from which a desired demultiplexing characteristic can be easily obtained and which incurs a small connection loss between the same and an optical fiber.

Another object of the present invention is to provide an optical module for wavelength-division multiplex optical transmission having a desired demultiplexing characteristic and incurring a small connection loss between the same and an optical fiber.

In accordance with an aspect of the present invention, there is provided a method of manufacturing an optical module for wavelength-division multiplex optical transmission, the module including a first optical fiber having a first port at its one end and a second and a third optical fiber fused to the first optical fiber at its side face such that the first optical fiber is positioned in the center between the second and third optical fibers, the second and third optical fibers having a second and a third port at their one ends, the method comprising the steps of: regulating the aspect ratio at the fused portion while heating the fused portion and elongating the fused portion at zero speed or a very low speed; and regulating the coupling length of the fused portion while elongating the fused portion at a higher speed than in the aspect ratio regulating step under the conditions of the heating temperature of the fused portion lowered and the aspect ratio kept unchanged.

Preferably, the regulation of the aspect ratio is performed such that, of a first wavelength $\lambda 1$ at which the intensity of the light beam output from the first port is maximized and a second wavelength $\lambda 2$ at which the output light beams from the second and third ports become equal in intensity with each other, the difference $\lambda 1 - \lambda 2$ becomes 0.25 µm and the regulation of the coupling length is performed such that the first wavelength $\lambda 1$ becomes equal to 1.55 µm. Thereby, the aspect ratio of the fused portion determines the wavelength $\lambda 1 - \lambda 2$ corresponding to the difference between the first wavelength $\lambda 1$ at which the intensity of the light beam output from the first port is maximized and the second wavelength $\lambda 2$ at which the output light beams from the second and third ports become equal in intensity with each other. On the other hand, the coupling length of the fused portion determines the first wavelength $\lambda 1$. Thus, according to the method of the present invention, a desired demultiplexing characteristic can be obtained with ease.

In accordance with another aspect of the present invention, there is provided an optical module for wavelength-division multiplex optical transmission comprising: a first optical fiber having a first port at its one end, the first optical fiber being adapted to propagate light beams with a wavelength of 1.3 μm and a wavelength of 1.55 μm therethrough; a second optical fiber fused to the side face of the first optical fiber and having a second port at its one end, the second optical fiber being adapted to propagate a light beam with the wavelength of 1.3 μm therethrough; a third optical fiber fused to the side face of the first optical fiber such that the second and the third optical fibers sandwich the first optical fiber therebetween and having a third port at its one end, the third optical fiber being adapted to propagate a light beam with the wavelength of 1.3 μm therethrough; a first photodetector disposed opposite to the first port adapted to detect a light beam with the wavelength of 1.55 μm; a light emitting device disposed opposite to the second port for emitting a light beam with the wavelength of 1.3 μm; and a second photodetector disposed opposite to the third port adapted to detect a light beam with the wavelength of 1.3 μm.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 2:
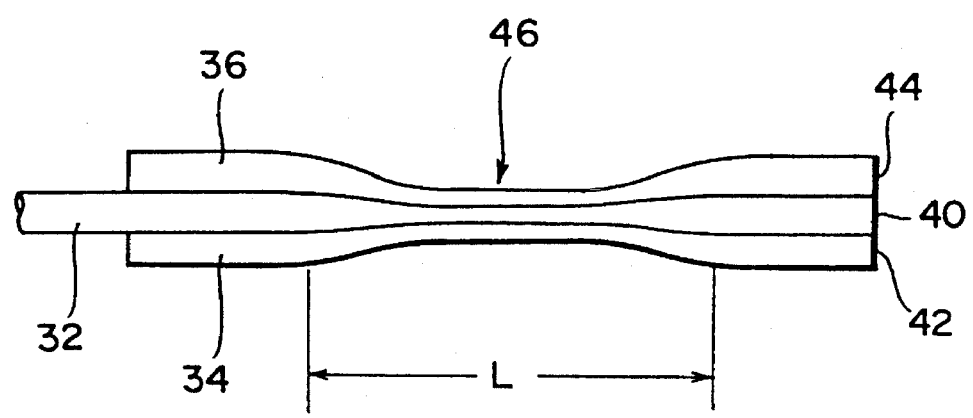
FIG. 2 is a diagram showing a basic structure of an optical module for wavelength-division multiplex optical transmission according to the present invention.

Referring to FIG. 2, there is shown a basic structure of an optical module for wavelength-division multiplex optical transmission according to the present invention. The optical module is structured first by fusing together a first, a second, and a third optical fiber 32, 34, and 36, each thereof being of an ordinary single mode type in which dispersion becomes zero at the wavelength 1.33 μm, at their side faces with the first optical fiber 32 positioned in the center, and then elongating the fused portion 46.

The first optical fiber 32 has a first port 40 at its right end, while the second optical fiber 34 and the third optical fiber 36 have a second port 42 and a third port 44 at their right ends, respectively. By using, for example, the first port 40 and the third port 44 as output ports and using the second port 42 as an input port, bidirectional optical transmission can be achieved. Referring to FIG. 2, what is denoted by L is the length of the fused portion 46, i.e., the coupling length.

Figure 3:
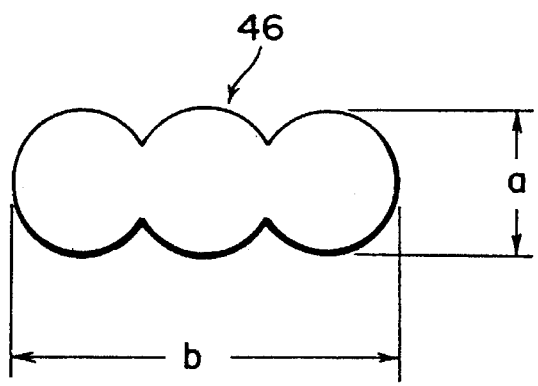
FIG. 3 is a diagram explanatory of an aspect ratio at a fused portion.

FIG. 3 is an explanatory diagram of the aspect ratio at the fused portion 46. The aspect ratio at the fused portion 46 is expressed by the value (b/a) obtained by dividing the longer length b of the cross section of the fused portion 46 by the shorter length a.

A method of manufacturing the optical module shown in FIG. 2 will be described below. The manufacturing method comprises a first step chiefly of fusing optical fibers together at their side faces and a second step chiefly of elongating the fused portion. In the first step, the fused portion is heated with the portion not elongated or slightly elongated and, in the meantime, the aspect ratio at the fused portion is regulated. The aspect ratio reduces virtually in proportion to the heating temperature and the heating time. In the second step, the fused portion is elongated to obtain a desired coupling length while the heating temperature is lowered to the point at which the aspect ratio does not change.

Figure 4:
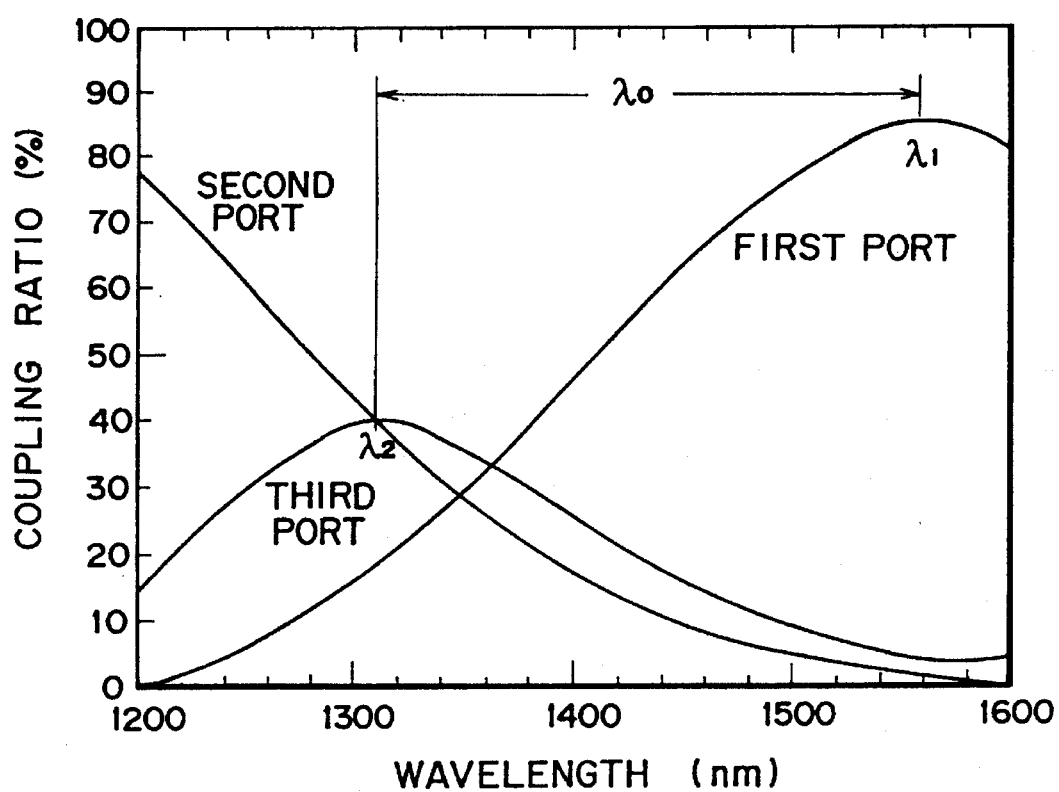
FIG. 4 is a graph showing relationships between coupling ratios and wavelengths in an optical module of the present invention.

FIG. 4 is a graph showing relationships between coupling ratios of the optical module manufactured as described above and wavelengths. Here, the coupling ratios are the ratios, when a light beam is input from the input port at the left end of the first optical fiber 32, of the intensity of the light beams output from the first, second, and third ports 40, 42, and 44 to the intensity of the input light beam. Now we call the wavelength at which the intensity of the light beam output from the first port 40 is maximized the first wavelength $\lambda 1$, call the wavelength at which the light beams output from the second port 42 and the third port 44 become equal in intensity with each other the second wavelength $\lambda 2$ ($<\lambda 1$), and denote the difference between these wavelengths by $\lambda 0$ ($=\lambda 1-\lambda 2$). Since the difference $\lambda 0$ is determined by the aspect ratio at the fused portion, the aspect ratio is regulated in the first step such that the difference $\lambda 0$ becomes 0.25 μm. Further, since the first wavelength $\lambda 1$ depends on the coupling length, the coupling length is regulated in the second step such that the first wavelength $\lambda 1$ becomes equal to 1.55 μm.

By regulating the aspect ratio and the coupling length as described above, a demultiplexing effect to separate light beams with the wavelength 1.55 μm and the wavelength 1.3 μm is produced between the first port 40 and the second and third ports 42 and 44, and a branching effect for the light beam with the wavelength 1.3 μm is produced between the second port 42 and the third port 44.

Figure 5:
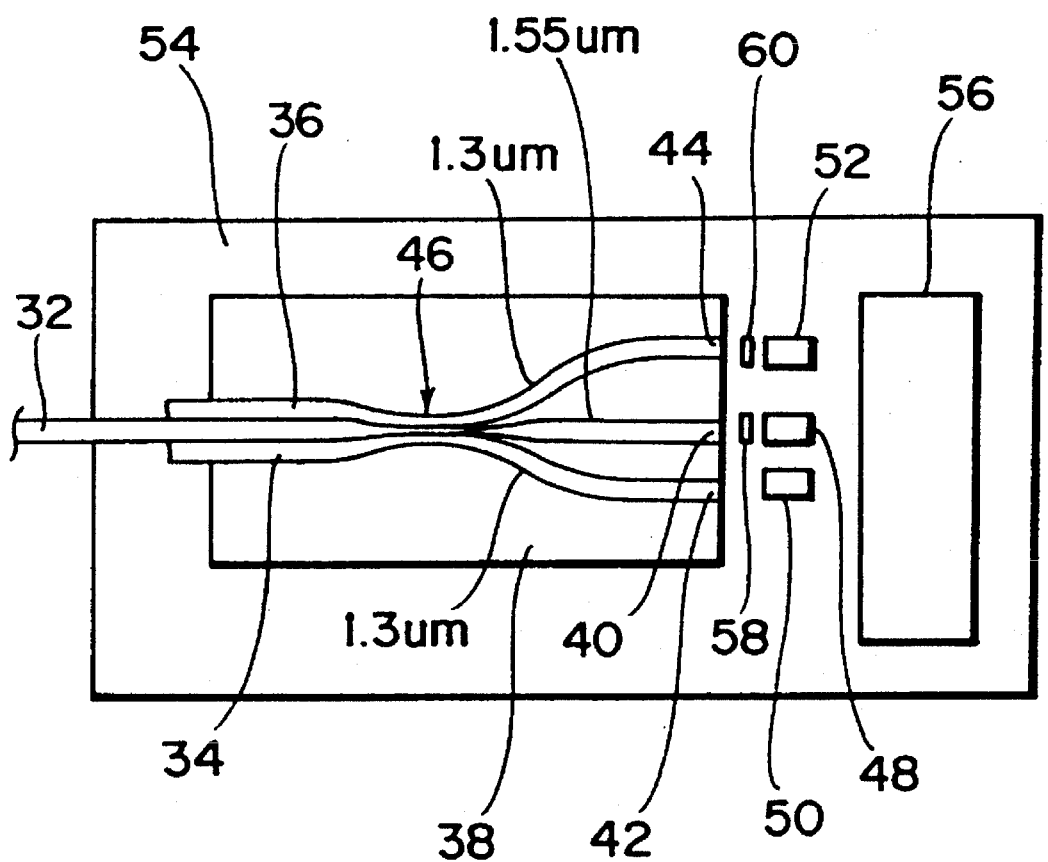
FIG. 5 is a plan view showing a general arrangement of an optical module according to an embodiment of the present invention.

Referring to FIG. 5, there is schematically shown a general arrangement of the optical module according to an embodiment of the present invention. Having component parts substantially equivalent to those in FIG. 2 denoted by corresponding reference numerals, duplicate explanation thereof will be omitted. In this embodiment, the fused portion 46 and the ports 40, 42, and 44 of the optical module are fixed on a quartz plate 38 with an adhesive and the quartz plate 38 is fixed on a substrate 54.

Reference numeral 48 denotes a photodetector formed of an avalanche photodiode or the like disposed opposite to the first port 40 for detecting the wavelength 1.55 μm, 50 denotes a light emitting device formed of a laser diode or the like disposed opposite to the second port 42 for emitting a light beam with the wavelength 1.3 μm. Reference numeral 52 denotes a photodetector formed of an avalanche photodiode or the like disposed opposite to the third port 44 for detecting the wavelength 1.3 μm. On the substrate 54, there are mounted an electronic circuit unit 56 including a driver circuit of the light emitting diode 48, amplifier circuits for the photodetectors 50 and 52, and the like.

The first optical fiber 32 is connected to the optical transmission line and optical signals with an optical signal of the wavelength 1.3 μm and an optical signal of the wavelength 1.55 μm multiplexed therein are transmitted over the first optical fiber 32. The optical signal with the wavelength 1.55 μm is output from the first port 40 and converted into an electric signal by the photodetector 48. The optical signal with the wavelength 1.3 μm is output from the third port 44 and converted into an electric signal by the photodetector 52. On the other hand, an optical signal with the wavelength 1.3 μm modulated in accordance with an input signal and output from the light emitting device 50 is input to the second optical fiber 34 through the second port 42, coupled with the first optical fiber 32 at the fused portion 46, and delivered to the optical transmission line connected with the first optical fiber 32. Thus, bidirectional optical transmission can be achieved.

Figure 1:
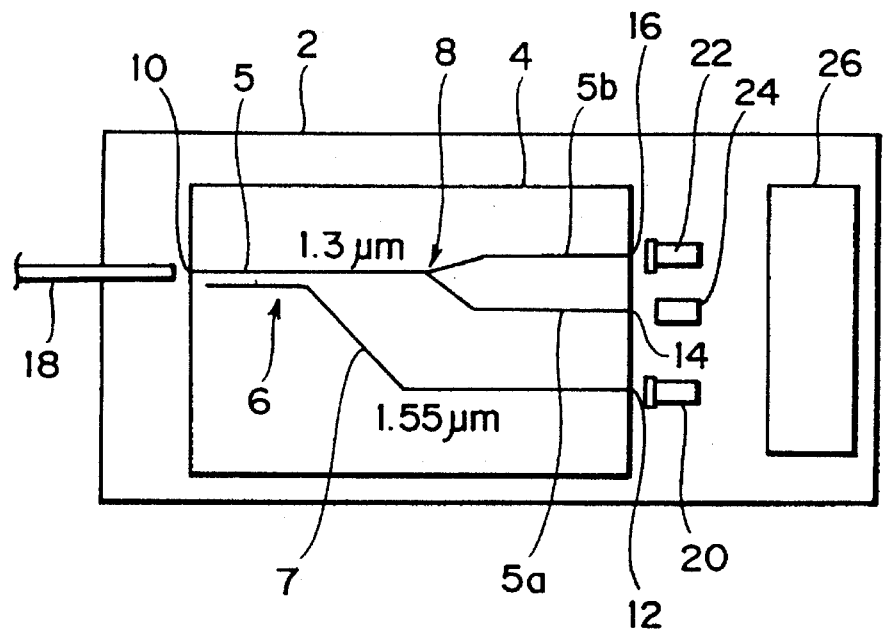
FIG. 1 is a schematic diagram explanatory of the prior art.

According to the present invention, the connection between the optical module and the optical transmission line can be achieved by a connection between optical fibers. Therefore, the loss incurred by the insertion of the optical module is very small. In concrete terms, the insertion loss of the optical module excluding the coupling loss with the light emitting device or photodetector was 1 dB at the port for the wavelength 1.55 μm and 4 dB at the ports for the wavelength 1.3 μm including the branching loss (3 dB). Incidentally, in the case of the prior art example shown in FIG. 1, the insertion loss of the port for the wavelength 1.55 μm was 2 dB and that of the ports for the wavelength 1.3 μm was 5 dB.

In order to improve the isolation of light beams at the port for light beam reception, it is preferable to insert an optical filter 58 transmitting the light beam with the wavelength 1.55 μm and suppressing the transmission of the light beam with the wavelength 1.3 μm between the first port 40 and the photodetector 48 and to insert an optical filter 60 transmitting the light beam with the wavelength 1.3 μm and suppressing the transmission of the light beam with the wavelength 1.55 μm between the third port 44 and the photodetector 52. By so arranging, an optical module having a high extinction ratio can be provided.

Although, in the above described embodiment, two photodetectors were arranged for detecting an optical signal with the wavelength 1.3 μm and another optical signal with the wavelength 1.55 μm, the arrangement may be modified such that a light emitting device outputting a light beam with the wavelength 1.55 μm is disposed in place of the photodetector 48, and only one optical signal with the wavelength 1.3 μm is received by the reception portion, while a multiplexed signal of an optical signal with the wavelength 1.3 μm and an optical signal with the wavelength 1.55 μm is transmitted from the transmission portion.

What is claimed is:

1. A method of manufacturing an optical module for wavelength-division multiplex optical transmission, said module including a first optical fiber having a first port at one end thereof and a second port at the other end thereof, and second and third optical fibers fused to said first optical fiber at the side face thereof such that said first optical fiber is positioned between center portions of said second and third optical fibers, said second optical fiber having a third port, said third optical fiber having a fourth port, said third and fourth ports being located on a same side as that of said second port of said first optical fiber, said method comprising the steps of:

fusing said second and third optical fibers to said first optical fiber;

regulating an aspect ratio at a fused portion while heating said fused portion and elongating said fused portion at zero speed or at a low rate substantially near zero speed, wherein said aspect ratio is a ratio (b/a) of a longer length (b) of a cross-section of said fused portion to a shorter length (a) of said cross-section of said fused portion, wherein said step of regulating said aspect ratio includes a step of directing at least a light source to said first port of said first optical fiber; and regulating a coupling length of said fused portion while elongating said fused portion at a higher speed than in said aspect ratio regulating step under conditions such that a heating temperature of the fused portion is lowered and said aspect ratio is kept unchanged, wherein said coupling length is a length of said fused portion which has been elongated, wherein said step of regulating said coupling length includes a step of directing at least said light source to said first port of said first optical fiber, wherein an intensity of a light beam outputted from said second port, having a first wavelength ($\lambda 1$), is dependent on said coupling length, wherein a second wavelength ($\lambda 2$), at which intensities of light beam outputted from said third and fourth ports become equal, is subtracted from said first wavelength ($\lambda 1$) to provide a difference wavelength ($\lambda 1 - \lambda 2$), said difference wavelength ($\lambda 1 - \lambda 2$) being determined based on said aspect ratio, and wherein the step of regulating said aspect ratio is performed so that the difference between the first wavelength and the second wavelength ($\lambda 1 - \lambda 2$) is 0.25 μm, and the step of regulating said coupling length is performed so that said first wavelength ($\lambda 1$) is equal to 1.55 μm.

* * * * *